US008611326B2

(12) United States Patent
Huang

(10) Patent No.: US 8,611,326 B2
(45) Date of Patent: Dec. 17, 2013

(54) LOCATION HISTORIES FOR LOCATION AWARE DEVICES

(75) Inventor: Ronald Keryuan Huang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 12/553,534

(22) Filed: Sep. 3, 2009

(65) Prior Publication Data

US 2011/0051665 A1 Mar. 3, 2011

(51) Int. Cl.
*H04J 3/16* (2006.01)

(52) U.S. Cl.
USPC .................. 370/346; 370/328; 455/414.2

(58) Field of Classification Search
None
See application file for complete search history.

(56) References Cited

U.S. PATENT DOCUMENTS

| | | | |
|---|---|---|---|
| 6,728,539 | B2 | 4/2004 | Kuwahara |
| 2005/0073443 | A1 | 4/2005 | Sheha et al. |
| 2005/0225643 | A1 | 10/2005 | Grignani |
| 2007/0271367 | A1 | 11/2007 | Yardeni et al. |
| 2007/0281689 | A1 | 12/2007 | Altman et al. |
| 2008/0254808 | A1 | 10/2008 | Rekimoto |
| 2009/0106778 | A1 | 4/2009 | Pomeroy et al. |
| 2009/0204899 | A1 | 8/2009 | Bennett |

FOREIGN PATENT DOCUMENTS

WO  WO-2010/087750  *  8/2010

OTHER PUBLICATIONS

Pash, Adam. "How Your Location-Aware iPhone Will Change Your Life," Jun. 5, 2008; 3 pages. Retrieved from the Internet: <URL: http://lifehacker.com/395171/how-your-location+aware-iphone-will-change-your-life>.
"NearPics Photography Developer: TheMacBox Price: Free," Jan. 26, 2009; 2 pages. Retrieved from the Internet: <URL: http://themacbox.co.uk/nearpics/>.
International Search Report and Written Opinion of the International Searching Authority, PCT Application Serial No. PCT/US2010/046238, Apr. 6, 2011, 15 pp.

* cited by examiner

*Primary Examiner* — Bob Phunkulh
(74) *Attorney, Agent, or Firm* — Meyertons, Hood, Kivlin, Kowert & Goetzel, P.C.

(57) ABSTRACT

A location aware mobile device can include a baseband processor for communicating with one or more communication networks, such as a cellular network or WiFi network. In some implementations, the baseband processor can collect network information (e.g., transmitter IDs) over time. Upon request by a user or application, the network information can be translated to estimated position coordinates (e.g., latitude, longitude, altitude) of the location aware device for display on a map view or for other purposes. A user or application can query the location history database with a timestamp or other query to retrieve all or part of the location history for display in a map view.

27 Claims, 6 Drawing Sheets

LOCATION HISTORIES FOR LOCATION AWARE DEVICES

TECHNICAL FIELD

This subject matter is related generally to location aware mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, etc. Modern mobile devices can include two or more of these applications. Due to the size limitation of a typical mobile device, such mobile devices may need to rely on a network or other remote service to support these multiple applications. For example, a map service may provide maps to a mobile device over a network, which can be used with one or more applications running on the mobile device. The introduction of a positioning system integrated with, or coupled to, the mobile device provides additional opportunities for providing location-based services.

Modern positioning systems include satellite based positioning systems, such as Global Positioning System (GPS), cellular network positioning based on "cell IDs" and WiFi positioning technology based on a WiFi networks. The satellite based positioning systems tend to be the most accurate. These satellite systems, however, often consume more power than the other positioning systems, and rely on the visibility of multiple satellites to determine a position estimate.

SUMMARY

A location aware mobile device can include a baseband processor for communicating with one or more communication networks, such as a cellular network or WiFi network. In some implementations, the baseband processor can collect network information over time. The network information can be converted to estimated position coordinates (e.g., latitude, longitude, altitude) of the location aware device. The position coordinates can be stored in a location history database on the location aware device or made accessible on a network. A user or application can query the location history database with a timestamp or other query to retrieve all or part of the location history for display in a map view. In some implementations, the size and "freshness" of the location history database can be managed by eliminating duplicate entries in the database and/or removing older entries. The location history can be used to construct a travel timeline for the location aware device. The travel timeline can be displayed in a map view or used by location aware applications running on the location aware device or on a network. In some implementations, an Application Programming Interface (API) can be used by an application to query the location history database.

In some implementations, the location history can allow users to tag photos or other content taken by a device and to synchronize the content with the location history using timestamps. This can allow the user to augment a travel timeline with the content, for example.

In some implementations, the network information can include transmitter identifiers (IDs). For example, Cell IDs can be tracked and recorded. The Cell IDs can be mapped to corresponding cell tower locations which can be used to provide estimated position coordinates of the location aware device. When a location history is requested by a user or application (e.g., through an API), the transmitter IDs can be translated to position coordinates of the location aware device which can be reverse geocoded to map locations for display on a map view or for other purposes. In other implementations, the network information can include WiFi scan data (e.g., access point IDs) which can be used to determine position coordinates of the location aware device, which can be reverse geocoded for display on a map view. In some implementations, the network information can be sent to a network server, which can translate the network information into position coordinates, which can be returned to the location aware device for processing by a location aware application.

In some implementations, other information related to various events can be recorded by the location aware device and associated with the location history. The other information can be displayed or otherwise made accessible to a user in a map view or other application. The other information and location history can be part of a personal "journal" for the user, which can be queried at a later time.

DETAILED DESCRIPTION

System Overview

Figure 1:
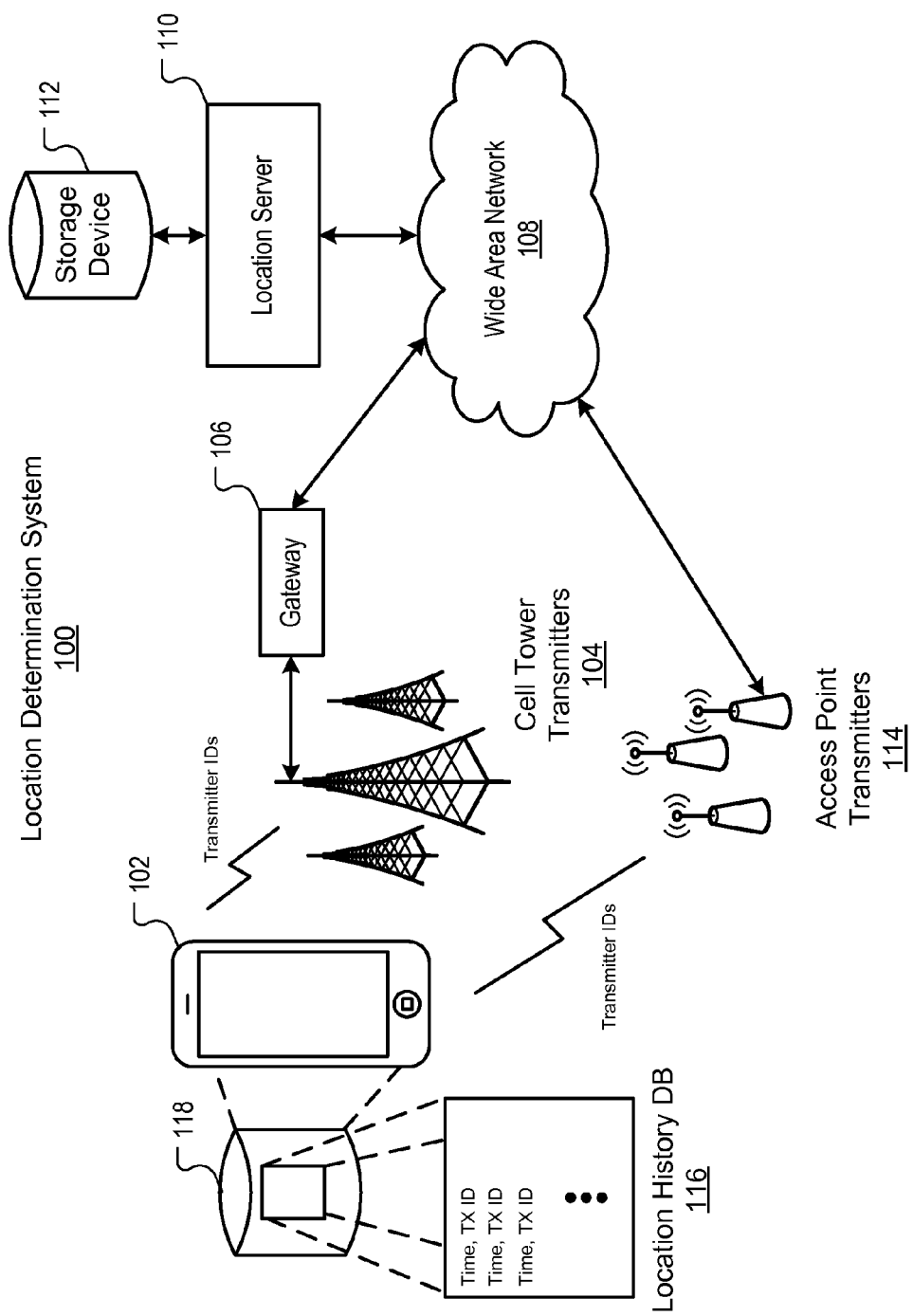
FIG. 1 is a block diagram of an exemplary location determination system in accordance with some implementations.

FIG. 1 is a block diagram of an exemplary location determination system 100. In some implementations, location determination system 100 can include location aware device 102, cellular tower transmitters 104, access point transmitters 114 (e.g., WiFi beacons), and location server 110. Cellular tower transmitters 104 can be coupled to wide area network 108 (e.g., the Internet) through gateway 106, and access point transmitters 114 can be coupled to network 108 through wired and/or wireless communication links.

Location aware device 102 can be any device capable of determining its current geographic location by communicating with a positioning system, such as GPS, cellular networks, WiFi networks, and any other technology that can be used to provide the actual or estimated location of a location aware device 102. Some examples of location aware devices include but are not limited to: a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. Location aware device 102 can include storage device 118 (e.g., flash memory, hard disk) for storing location history database (DB) 116.

Location server 110 can include one or more server computers operated by a location service provider. Location server 110 can deliver location information to location aware device 102.

In some implementations, location aware device 102 collects and stores network information associated with transmitter detection events. The network information can include a transmitter identifier (ID) of a detected transmitter and a timestamp marking a time of the transmitter detection event. Some examples of transmitter IDs include but are not limited to Cell IDs provided by cell tower transmitters in a cellular communications network (e.g., transmitters on GSM masts) and access point transmitter IDs (e.g., a Media Access Control (MAC) address). A wireless access point (AP) can be a hardware device or a computer's software that acts as a communication hub for users of a wireless device to connect to a wired LAN.

A sequence of transmitter IDs can be correlated with known geographic locations of corresponding transmitters. The geographic locations of the transmitters can be used to compute estimated position coordinates (e.g., latitude, longitude, altitude) for location aware device 102 over a period of time, resulting in a location history for location aware device 102. For example, a sequence of transmitter IDs can be compared with a reference database (e.g., Cell ID database, WiFi reference database) that maps or correlates the transmitter IDs to position coordinates of corresponding transmitters, and computes estimated position coordinates for location aware device 102 based at least in part on the position coordinates of the corresponding transmitters. If a reference database is available on location aware device 102, then the mapping can be performed by a processor of location aware device 102. Alternatively, the transmitter IDs can be sent to location server 110 which can store transmitter position coordinates in a remote reference database in storage device 112. Location server 110 can map or correlate transmitter IDs to position coordinates of corresponding transmitters which can be sent back to location aware device 102 through network 108 and one or more wireless communication links. The position coordinates can be reverse geocoded to map locations (e.g., street locations). The map locations can be represented by markers (e.g., pushpin icons) on a map view displayed by location aware device 102, or used for other purposes by location aware applications.

The position coordinates and associated timestamps can be stored in location history database 116 and/or storage device 112 for subsequent retrieval and processing by a user or application. The position coordinates and timestamps can be used to construct a timeline in a map view showing a history of locations for location aware device 102. In some implementations, timestamps associated with the position coordinates can be used to query database 116 or a remote database on storage device 112 for location history data responsive to query from a user or application, as described in reference to FIG. 3B.

In some implementations, location history database 116 can be correlated or related to other recorded data (e.g., related using a relational database). A data recording event occurs when data associated with an event is stored in location aware device 102 or on a network storage device (e.g., storage device 112). Some examples of recorded data include but are not limited to: data associated with a picture taking event, data associated with a financial transaction, sensor output data, data associated with a communication event (e.g., receipt of phone call or instant message), data associated with a network event (e.g., a wired or wireless connection or disconnection with a network), etc.

In some implementations, recorded data, together with location history data and corresponding timestamps can be used to create and store a personal "journal" for a user of location aware device 102. In example system 100, the recorded data or "journal" can be stored on location aware device 102 or stored on storage device 112 by location server 110.

Figure 3A:
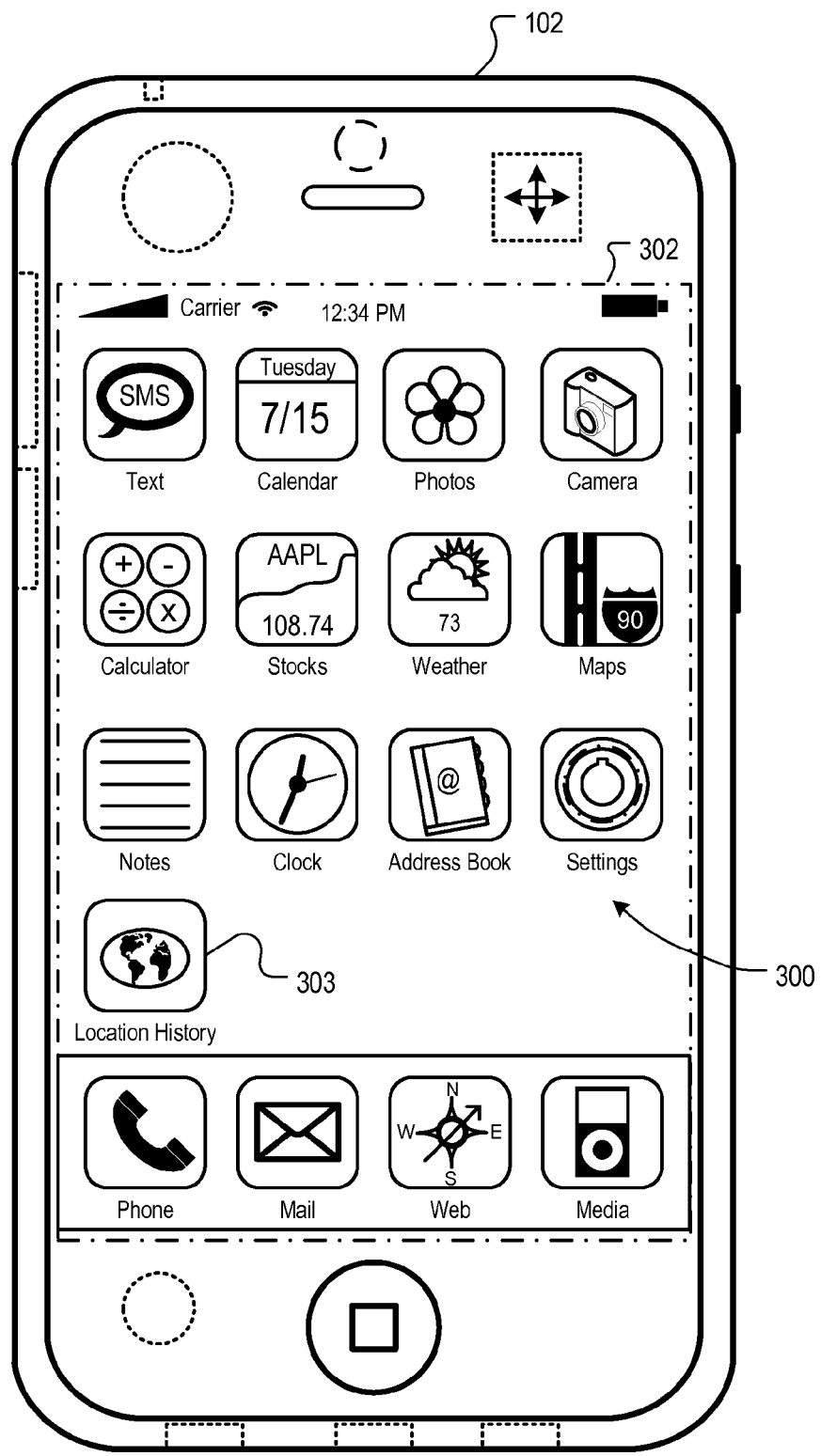
FIG. 3A illustrates an exemplary home screen of a location aware device capable of storing and processing location history data in accordance with some implementations.
Figure 3B:
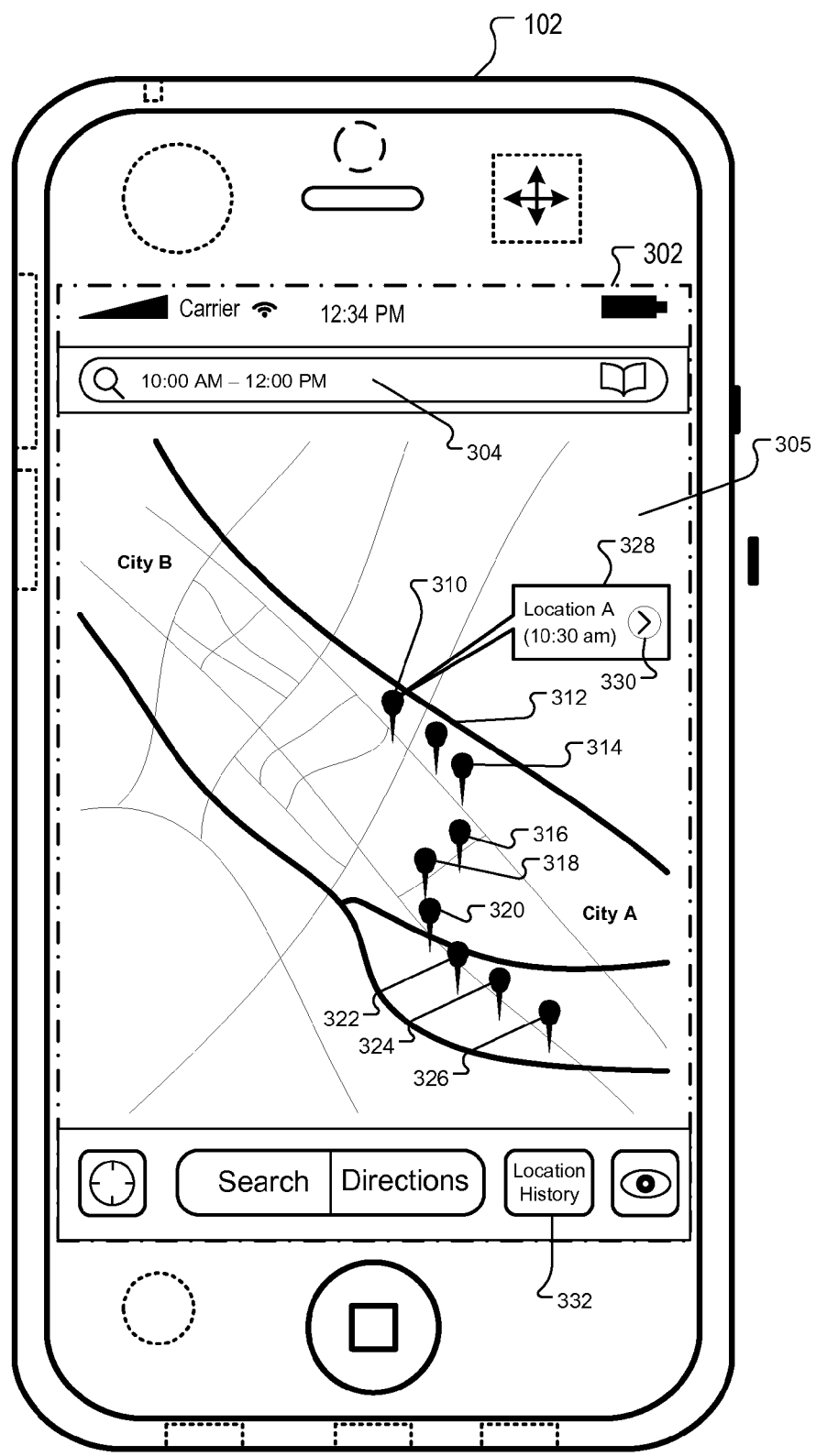
FIG. 3B illustrates an exemplary search interface for a location aware device capable of retrieving and displaying location history data in accordance with some implementations.

In some implementations, the recorded data can be displayed with corresponding location markers on a map view, as described in reference to FIG. 3B. The data can be displayed in the map view or other user interface, and/or a link (e.g., hypertext link) or other reference can be displayed with the marker to allow access to the recorded data.

In some implementations, the transmitter detection event data (e.g., transmitter IDs) are received while location aware device 102 is operating in a low power mode. A lower power mode can occur, for example, when satellite positioning receiver (e.g., a GPS receiver) of location aware device 102 is turned off to conserve power. In low power mode, a power efficient processor (e.g., a 3G baseband processor) can accumulate and store transmitter IDs for computing location history data. Baseband processors are used in radio-frequency (RF) subsystems, such as the RF subsystem 524 shown in FIG. 5. Baseband processors are used to transmit and receive radio signals in, for example, GSM (Global System for Mobile communications), GPRS (General Packet Radio Service) and EGPRS (Enhanced General Packet Radio Service) telecommunication devices, such as cellular mobile phones.

During reception of radio signals, the RF subsystem receives radio signals, converts the radio signals into baseband signals and sends the baseband signals to the baseband processor. Thereafter the baseband processor processes the received baseband signals and decodes various data, including transmitter IDs (e.g., Cell IDs). In many location aware mobile devices, a GPS receiver consumes significantly more power than a baseband processor. Thus, the collecting and storing of transmitter IDs can be achieved by a baseband processor without the high consumption of power associated with, for example, a GPS receiver.

Location histories can be computed from transmitter IDs collected with a low power baseband processor. The transmitter IDs can be used to reconstruct a location history timeline for display in a map view. The location history can be correlated or related to data from other recording events, allowing the data to be displayed or otherwise made accessible to a user in a map view application or other application. A sequence of locations traveled by location aware device 102 in the past can be displayed in a map view as a timeline, the span of which can be specified by a user or application generated query, as described in reference to FIG. 3B.

Example Location History Process

Figure 2:
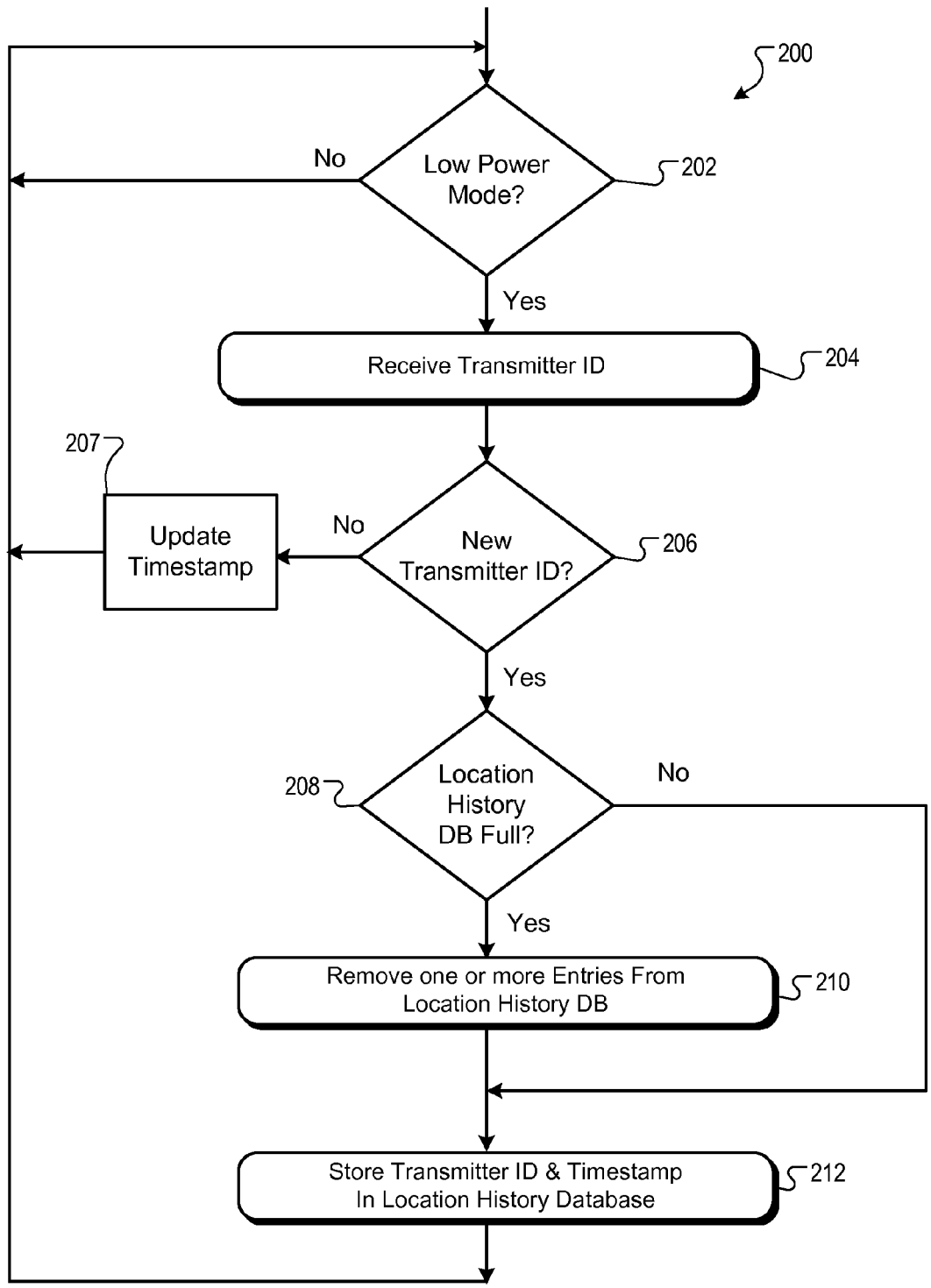
FIG. 2 is a flow diagram of an exemplary process for generating and storing location history data for location aware devices in accordance with some implementations.

FIG. 2 is a flow diagram of an exemplary process 200 for generating and storing location history data for location aware devices. Process 200 will be described as if performed by location aware device 102, described in reference to FIG. 1.

In some implementations, if the location aware device is in a low power or sleep mode (202) for a period of time, the location aware device can be configured to receive transmitter IDs (204) that are within communication range of the location aware device. The transmitter IDs can be collected on a scheduled basis (e.g., collected every 10 minutes) and/or in response to a trigger event (e.g., whenever the user or an application requests location data).

In low power or sleep mode, a satellite positioning receiver (e.g., GPS receiver) may be powered down to conserve power or because there is an insufficient number of satellites available to compute a navigation solution (e.g., GPS receiver is operated indoors). In low power mode, the transmitter IDs can be collected by, for example, a baseband processor that often consumes less power than, for example, a GPS receiver. In some implementations, transmitter IDs can be collected even if the location aware device is operating in a normal power mode. This scenario could occur with location aware devices that do not include satellite positioning systems.

In some cases, the same transmitter ID may be received multiple times by the location aware device in a short period of time, potentially resulting in duplicate entries in the location history database. This could occur, for example, if the device remains stationary while in the vicinity of a transmitter. In such cases, duplicate entries can be detected and removed from the location history database. Referring to process 200, if a new transmitter ID is received (206), and the location history database is not full (208), then the transmitter ID and corresponding timestamp can be stored in the location history database (212). In some implementations, if the transmitter ID was received in the past (206) and stored in the location history database, process 200 can update the timestamp of the entry (207) and return to step (202).

If a new transmitter ID is received (206), and the location history database is full (208), the entry from the location history database can be removed from the location history database to make room for the new entry (210). In this manner, step (210) ensures that the size and "freshness" of the location history database can be managed. Any suitable database management policy can be implemented to determine which location entry to remove from the database. For example, in one implementation an "aging" algorithm can be used to remove the oldest entry based on a comparison of timestamps. In another implementation, all or a portion of the location history database can be purged whenever the location aware device is powered down for a period of time. In some implementations, a user interface can be provided to a user of the location aware device which allows the user to manually purge the location history database.

In some implementations, a single accurate location (e.g., a single transmitter ID) or a smaller number of transmitter IDs representing a defined time span can be stored in the location history database to reduce the size of the location history database. For example, a week's worth of working and commuting to and from home can be represented by a single or small number of transmitter IDs since the route from home to work may not change during the work week. This option can be specified by the user through a user interface which allows the user to specify the frequency of transmitter ID recording and/or specify periods of time where recording will or will not occur.

Other implementations may employ other means for reduction of the size of the location history database, such as various data compression techniques. For example, repetitive patterns of locations may be encoded as a shorter symbol or set of symbols within the database, and a look up table may be used to map the symbols to a set of locations.

FIG. 3A illustrates an exemplary home screen 300 of a location aware device 102 capable of storing and processing location history data. In some implementations, location aware device 102 can be a mobile phone. The device 102 can include a touch sensitive display 302 or touch pad that can receive touch input and gestures. In the example shown, home screen 300 can include a number of icons that can be touched by a user to invoke an application. For example, if the user touches icon 303, a location history application can be invoked and a location history user interface can be displayed.

FIG. 3B illustrates an exemplary search interface 305 for location aware device 102. Search interface 305 can include search box 304, which a user can use to enter a time span for location history. In the example shown, the user entered the time span 10:00 AM-12:00 PM. In some implementations, the time span can be used to query location history database 116. Location entries that are responsive to the query can be used to display markers on a map view when the user touches location history button 332. In the example shown, markers 310, 312, 314, 316, 318, 320, 322, 324 and 326 correspond to locations in location history database 116 that are responsive to the time span query: 10:00 AM-12:00 PM. Each marker can have call out 328 for displaying information and for providing user interface element 330 for accessing other recorded data. The other recorded data can include but is not limited to: photos, video, text, hyperlinks, click to call telephone numbers, advertisements, etc.

Example Network Operating Environment

Figure 4:
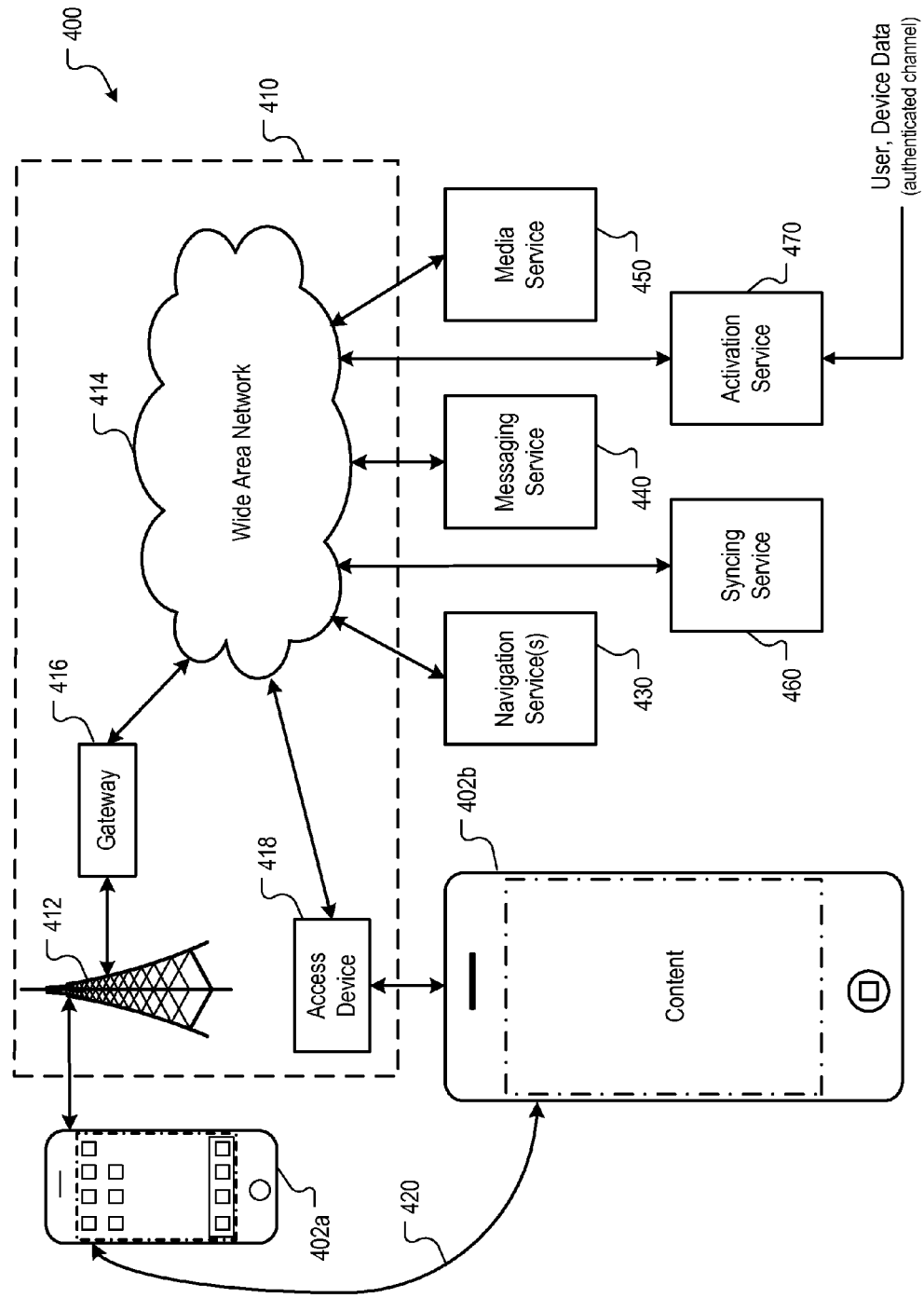
FIG. 4 is a block diagram of an example network operating environment for location aware device of FIG. 1 in accordance with some implementations.

FIG. 4 is a block diagram of an example network operating environment 400 for location aware device 102 of FIG. 1. In FIG. 4, location aware devices 402a and 402b each can represent location aware device 102. Devices 402a and 402b can, for example, communicate over one or more wired and/or wireless networks 410 in data communication. For example, wireless network 412, e.g., a cellular network, can communicate with wide area network (WAN) 414, such as the Internet, by use of gateway 416. Likewise, access device 418, such as an 802.11g wireless access device, can provide communication access to wide area network 414. In some implementations, both voice and data communications can be established over wireless network 412 and access device 418. For example, device 402a can place and receive phone calls (e.g., using VoIP protocols), send and receive e-mail messages (e.g., using POP3 protocol), and retrieve electronic documents and/or streams, such as web pages, photographs, and videos, over wireless network 412, gateway 416, and wide area network 414 (e.g., using TCP/IP or UDP protocols). Likewise, in some implementations, device 402b can place and receive phone calls, send and receive e-mail messages, and retrieve electronic documents over access device 418 and wide area network 414. In some implementations, device 402a or 402b can be physically connected to access device 418 using one or more cables and access device 418 can be a personal computer. In this configuration, device 402a or 402b can be referred to as a "tethered" device. Connectivity with a wired or wireless network can allow devices to share location histories with each other or with a remote service (e.g., navigation services 430).

Devices 402a and 402b can also establish communications by other means. For example, wireless device 402a can communicate with other wireless devices, e.g., other devices 402a or 402b, cell phones, etc., over wireless network 412. Likewise, devices 402a and 402b can establish peer-to-peer communications 420, e.g., a personal area network, by use of one or more communication subsystems, such as the Bluetooth™ communication devices. Other communication protocols and topologies can also be implemented.

Device 402a or 402b can, for example, communicate with one or more services 430, 440, 450, 460, and 470 over one or more wired and/or wireless networks 410. For example, one or more navigation services 430 can provide navigation information, e.g., map information, location information, route information, and other information, to device 402a or 402b. A user of device 402b can invoke a map functionality by pressing a maps icon on a top-level graphical user interface, such as home screen 304 shown in FIG. 3A, and can request and receive a map for a particular location, request and receive route directions, or request and receive listings of businesses in the vicinity of a particular location, for example.

Navigation services 430 can receive transmitter IDs, perform a translation to position coordinates using a reference database and serve map views with markers to the location aware device for display or for other purposes. In some implementations, navigation service 430 can provide an online facility (e.g., a Web site) for users to share location histories or network information. Navigation service 430 can use the transmitter IDs to update or improve the accuracy of the reference database.

Messaging service 440 can, for example, provide e-mail and/or other messaging services. Media service 450 can, for example, provide access to media files, such as song files, audio books, movie files, video clips, and other media data. In some implementations, separate audio and video services (not shown) can provide access to the respective types of media files. Syncing service 460 can, for example, perform syncing services (e.g., sync files). Activation service 470 can, for example, perform an activation process for activating device 402a or 402b. Other services can also be provided, including a software update service that automatically determines whether software updates exist for software on device 402a or 402b, then downloads the software updates to device 402a or 402b where the software updates can be manually or automatically unpacked and/or installed.

Device 402a or 402b can also access other data and content over one or more wired and/or wireless networks 410. For example, content publishers, such as news sites, RSS feeds, web sites, blogs, social networking sites, developer networks, etc., can be accessed by device 402a or 402b. Such access can be provided by invocation of a web browsing function or application (e.g., a browser) in response to a user touching, for example, a Web object.

Example Mobile Device Architecture

Figure 5:
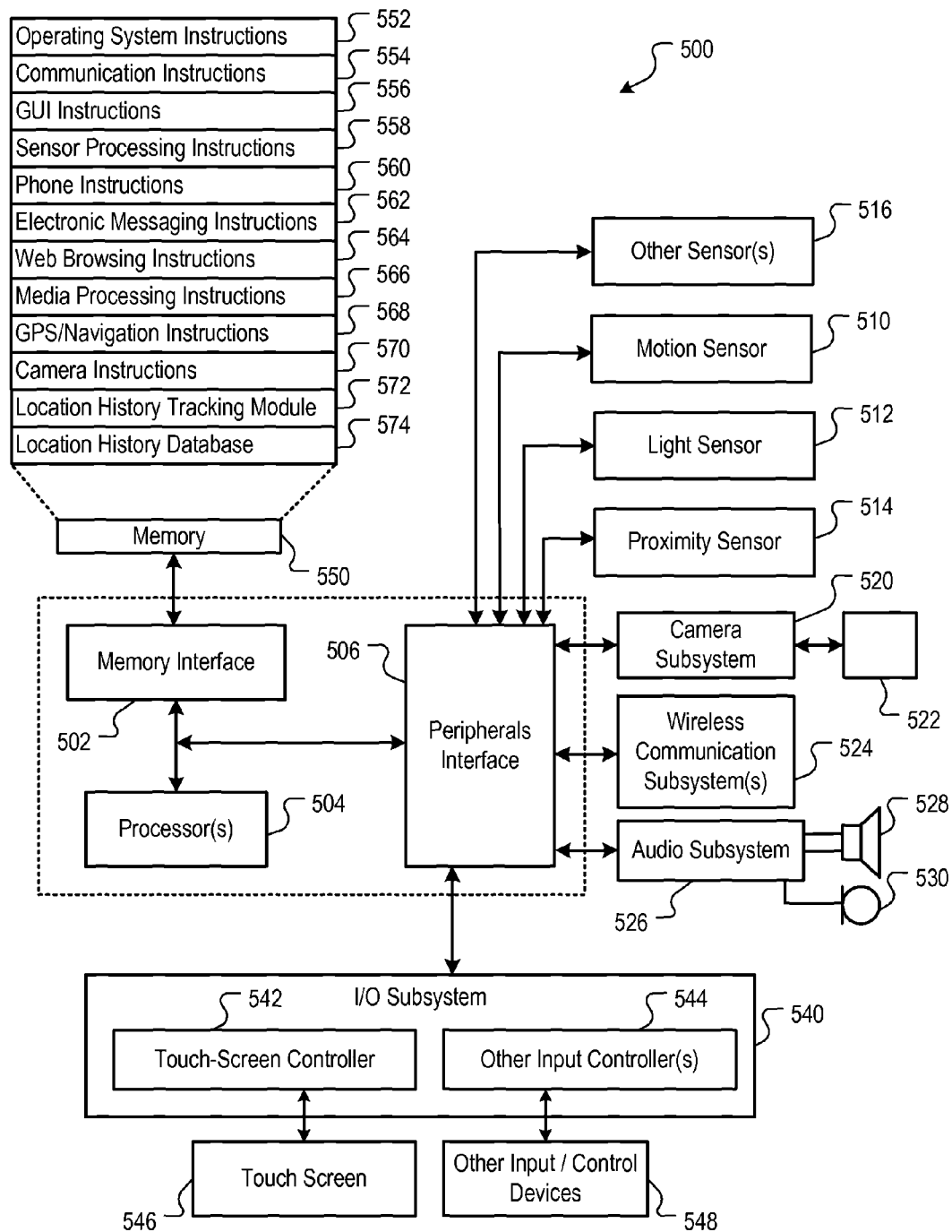
FIG. 5 is a block diagram of an exemplary architecture for a location aware device capable of storing and processing location history data in accordance with some implementations.

FIG. 5 is a block diagram of an example architecture 500 of location aware device 102 of FIG. 1. Device 102 can include memory interface 502, one or more data processors, image processors and/or central processing units 504, and peripherals interface 506. Memory interface 502, one or more processors 504 and/or peripherals interface 506 can be separate components or can be integrated in one or more integrated circuits. The various components in device 102 can be coupled by one or more communication buses or signal lines.

Sensors, devices, and subsystems can be coupled to peripherals interface 506 to facilitate multiple functionalities. For example, motion sensor 510, light sensor 512, proximity sensor 514 can be coupled to peripherals interface 506 to facilitate orientation, lighting, and proximity functions. Other sensors 516 can also be connected to peripherals interface 506, such as a positioning system (e.g., GPS receiver), a temperature sensor, a biometric sensor, magnetic compass, FM or satellite radio, or other sensing device, to facilitate related functionalities.

Camera subsystem 520 and optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of communication subsystem 524 can depend on the communication network(s) over which device 102 is intended to operate. For example, device 102 may include communication subsystems 524 designed to operate over a GSM network, a GPRS network, an EDGE network, a Wi-Fi or WiMax network, and a Bluetooth™ network. In particular, wireless communication subsystems 524 may include hosting protocols such that device 102 may be configured as a base station for other wireless devices.

Audio subsystem 526 can be coupled to speaker 528 and microphone 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to touch screen 546. Touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a stylus. One or more buttons (not shown) can include an up/down button for volume control of speaker 528 and/or microphone 530.

In one implementation, a pressing of the button for a first duration may disengage a lock of touch screen 546; and a pressing of the button for a second duration that is longer than the first duration may turn power to device 102 on or off. The user may be able to customize a functionality of one or more of the buttons. Touch screen 546 can, for example, also be used to implement virtual or soft buttons and/or a keyboard. In addition to touch screen 546, device 102 can also include a touch pad.

In some implementations, device 102 can present recorded audio and/or video files, such as MP3, AAC, and MPEG files. In some implementations, device 102 can include the functionality of an MP3 player, such as an iPod™. Device 102 may, therefore, include a connector that is compatible with the iPod™. Other input/output and control devices can also be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store an operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can be a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing, such as described in reference to FIGS. 1-4; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; and location history module 572 and location history database 574 to facilitate the processes and functions described in reference to FIGS. 1-4. Memory 550 may also store other software instructions (not shown), such as web video instructions to facilitate web video-related processes and functions; and/or web shopping instructions to facilitate web shopping-related processes and functions. In some implementations, media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of device 102 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of what is disclosed here, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a location aware device, the method comprising:
   configuring a processor of the location aware device to collect network information broadcast from a number of network transmitters over a time span, wherein the network information is indicative of previous locations of the device;
   providing the network information and corresponding timestamps for storage in a database as location history data;
   associating, using the timestamps, at least one photograph taken by the location aware device with one of the previous locations of the device;
   receiving a request for location history of the device;
   responsive to the request, translating the network information stored in the database into position coordinates for each of the previous locations of the device; and
   responsive to the request, displaying a map view on the device visually indicating the previous locations of the device, wherein said displaying further comprises:
      displaying markers on the map view as a timeline according to the position coordinates, the markers indicating the location history of the location aware device for the time span;
      displaying, in association with at least a subset of the markers, time information of the timestamp corresponding to the respective marker; and
      displaying on the map view, in association with at least one of the markers, at least one link to the at least one photograph, wherein the at least one of the markers indicates the one of the previous locations associated with the at least one photograph.

2. The method of claim 1, where configuring the processor to collect network information comprises:
   configuring a baseband processor to collect transmitter identifiers.

3. The method of claim 2, where the network information is provided by a cellular network or a wireless local area network.

4. The method of claim 3, where the network information is provided by a cellular network and the transmitter identifiers are cell identifiers.

5. The method of claim 3, where the network information is provided by a wireless local area network and the transmitter identifiers are Media Access Control (MAC) addresses for access point devices.

6. The method of claim 1, further comprising:
   determining that a satellite positioning system is not available; and
   in response to determining that the satellite positioning system is not available, configuring the processor of the location aware device to collect network information broadcast from a number of network transmitters over the time span.

7. The method of claim 1, where the database is included in the location aware device and is configured to be searchable by a user of the location aware device.

8. The method of claim 7, where the database is configured to be queried for at least a portion of the location history data.

9. The method of claim 8, further comprising:
   querying the database for at least a portion of the location history data; and
   retrieving network information from the database that is responsive to the query, wherein the network information translated into position coordinates comprises the network information retrieved from the database.

10. The method of claim 1, further comprising:
    storing event data related to events occurring over the time span; and
    associating the event information with the location history data.

11. The method of claim 10, further comprising:
    querying the database for at least a portion of the location history data;
    retrieving network information from the database that is responsive to the query, wherein the network information translated into position coordinates comprises the network information retrieved from the database; and
    displaying the event data on the map view, such that the event data is visually associated with one or more markers.

12. The method of claim 11, further comprising:
displaying a user interface element on the map view, the user interface element operable for providing access to at least some event data.

13. A system, comprising:
memory configured for storing a database;
a digital camera coupled to the memory; and
a processor coupled to the memory, the processor configured for:
collecting network information broadcast from a number of network transmitters over a time span, wherein the network information is indicative of previous locations of the device;
storing the network information and corresponding timestamps in a database as location history data;
associating, using the timestamps, at least one photograph taken by the digital camera with one of the previous locations of the device;
receiving a request for location history; and
responsive to the request, translating the network information stored in the database into position coordinates and generating a map view of the previous locations of the device using the position coordinates, wherein said generating a map view further comprises:
displaying markers on the map view as a timeline according to the position coordinates, the markers indicating the location history of the location aware device for the time span;
displaying, in association with a subset of the markers, time information of the timestamp corresponding to the respective marker; and
displaying on the map view, in association with at least one of the markers, at least one link to the at least one photograph, wherein the at least one of the markers indicates the one of the previous locations associated with the at least one photograph.

14. The system of claim 13, further comprising:
a baseband processor configured to collect transmitter identifiers.

15. The system of claim 14, where the network information is provided by a cellular network or a wireless local area network.

16. The system of claim 15, where the network information is provided by a cellular network and the transmitter identifiers are cell identifiers.

17. The system of claim 15, where the network information is provided by a wireless local area network and the transmitter identifiers are Media Access Control (MAC) addresses for access point devices.

18. The system of claim 13, where the processor is configured for:
determining that a satellite positioning system is not available; and
in response to determining that the satellite positioning system is not available, configuring the processor of the location aware device to collect network information broadcast from a number of network transmitters over the time span.

19. The system of claim 13, where the database is configured to be searchable by a user of the location aware device.

20. The system of claim 19, where the database is configured to be queried for at least a portion of the location history data.

21. The system of claim 13, where the processor is configured for:
querying the database for at least a portion of the location history data; and
retrieving network information from the database that is responsive to the query, wherein the network information translated into position coordinates comprises the network information retrieved from the database.

22. The system of claim 13, where the processor is configured for:
storing event data related to events occurring over the time span; and
associating the event information with the location history data.

23. The system of claim 22, where the processor is configured for:
querying the database for at least a portion of the location history data;
retrieving network information from the database that is responsive to the query, wherein the network information translated into position coordinates comprises the network information retrieved from the database;
displaying the event data on the map view, such that the event data is visually associated with one or more markers.

24. The system of claim 23, where the processor is configured for:
displaying a user interface element on the map view, the user interface element for providing access to at least some of the event data.

25. A computer-implemented method performed by a location aware device, the method comprising:
configuring a processor of the location aware device to collect transmitter identifiers broadcast from a number of network transmitters over a time span;
converting the transmitter identifiers into position coordinates;
storing the position coordinates and corresponding timestamps in a database of the location aware device;
associating, using the timestamps, at least one photograph taken by the location aware device with one of the position coordinates;
receiving a search query specifying a search time span;
responsive to the search query, generating a map view including markers identifying a location history of the location aware device for the search time span, the location history based on position coordinates corresponding to timestamps within the search time span, the map view further including time information of at least one of the timestamps within the search time span;
displaying the map view, time information, and markers on a display of the location aware device; and
displaying on the map view, in association with at least one of the markers, at least one link to the at least one photograph, wherein the at least one of the markers indicates the one of the previous locations associated with the at least one photograph.

26. A computer-implemented method performed by a device, the method comprising:
configuring a processor of the location aware device to collect transmitter identifiers broadcast from a number of network transmitters over a time span;
converting the transmitter identifiers into position coordinates;
providing the position coordinates and corresponding timestamps for storage in a database;

associating, using the timestamps, at least one photograph taken by the location aware device with one of the position coordinates;
in response to user input, retrieving the position coordinates and corresponding timestamps from the database and generating a map view including markers identifying a location history of the device for the search time span, the location history based on position coordinates corresponding to timestamps within the search time span, the map view further including time information of at least one of the timestamps within the search time span;
displaying the map view, time information, and markers on a display of the device; and
displaying on the map view, in association with at least one of the markers, at least one link to the at least one photograph, wherein the at least one of the markers indicates the one of the previous locations associated with the at least one photograph.

27. A mobile wireless communication device, comprising:
an antenna for performing wireless communication;
a digital camera;
a display;
a processor, wherein the processor is configured to:
  collect network information broadcast from a number of network transmitters over a time span, wherein the network information is indicative of previous locations of the device;
  provide the network information and corresponding timestamps to a database as location history data;
  associating, using the timestamps, at least one photograph taken by the digital camera with one of the previous locations of the device;
  receive a request for location history;
  responsive to the request, generate a map view of the previous locations of the device using the position coordinates derived from the network information and using the corresponding timestamps, the map view further including time information of at least one of the timestamps within the search time span; and
  displaying on the map view, in association with at least one of the previous locations of the device, at least one link to the at least one photograph.

* * * * *